Patented Jan. 11, 1949

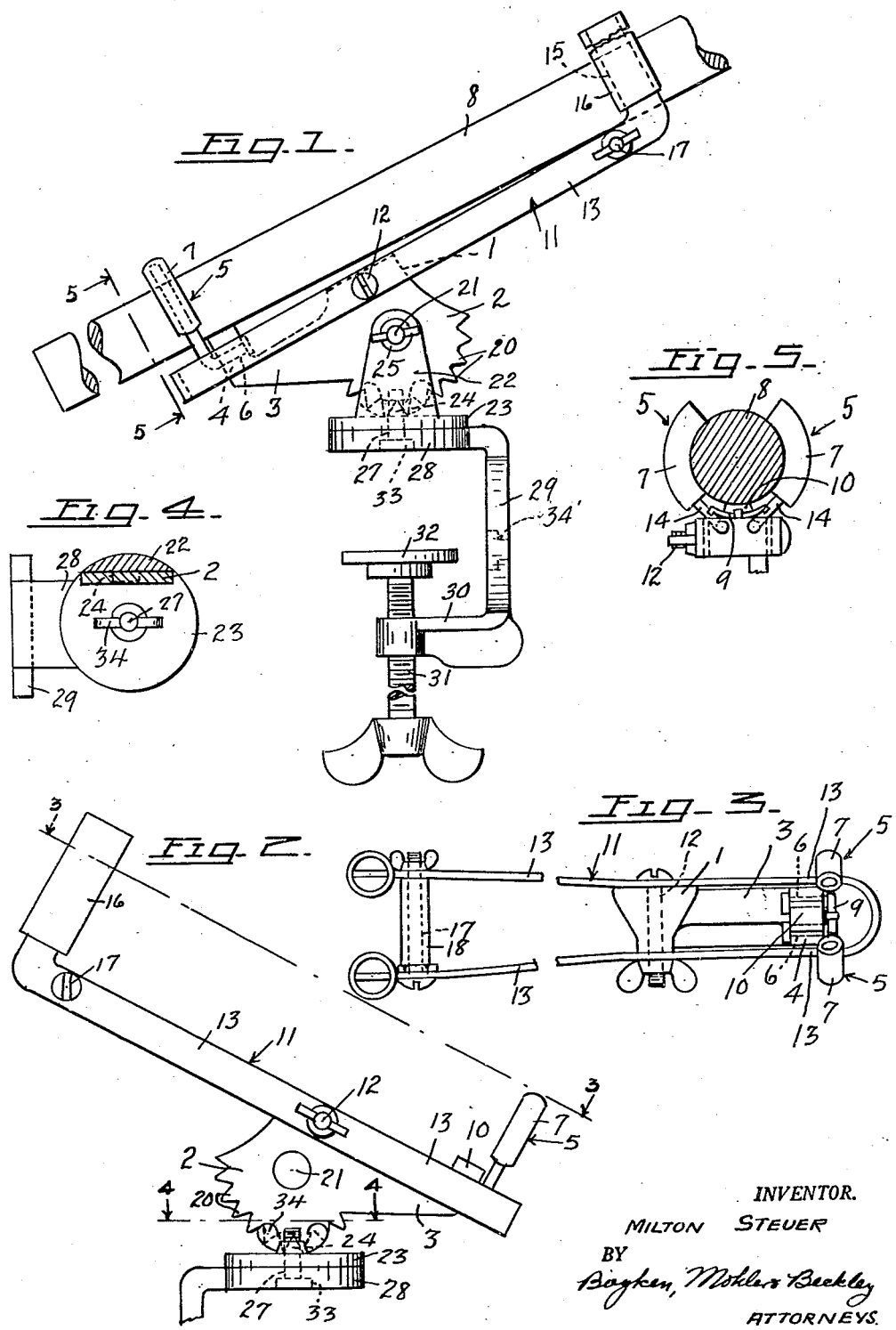

2,458,881

UNITED STATES PATENT OFFICE 2,458,881

FISHING ROD HOLDER

Milton Steuer, San Francisco, Calif.

Application October 28, 1944, Serial No. 560,771

1 Claim. (Cl. 248—42)

This invention relates to a fishing rod holder and has for one of its objects a holder having means for automatically holding the fishing rod in inclined or horizontal position actuated by the gravitational influence of the rod and which means automatically releases the rod upon lifting the latter from the holder for manual casting or manipulation thereof.

Another object of the invention is a holder adapted to support a fishing rod in inclined or horizontal position and which holder is provided with means adapted to automatically secure the rod in such position with a grip that is proportional to the pull exerted on the line, and which holder with said means is supported for movement about a vertical axis so as to permit the outer end of the pole to follow the movements taken by the fish or to swing relative to the boat from which the fishing may take place.

A still further object of the invention is the provision of a quick releasing holder for a fishing rod that is actuated for gripping and for releasing the rod solely by the weight of the rod, the said holder automatically releasing the rod when the latter is lifted therefrom and automatically gripping the rod when the rod is positioned on the same.

Heretofore, fishing rod holders of various kinds have been employed, but in some of them considerable time is required to secure them to the holders or to release them therefrom, or both. In certain of these and other holders when a strike is made and pull comes on the line, the rod is jerked from the holder, while in other instances, the line may be snapped at the pole tip due to the maneuvering of the fish or swing of the boat and inability of the pole to move to accommodate itself to the different directional changes. Also, many holders lack adjustability for holding the pole in different angular positions relative to vertical.

The above objections and others are completely overcome by my invention as will be apparent from the description and drawings.

It is to be understood that the drawings and description are merely illustrative of a preferred form of the invention, but are not to be considered restrictive thereof.

In the drawings,

Fig. 1 is a side elevational view of the holder with the handle of the rod shown thereon.

Fig. 2 is an elevational view of the opposite side of the holder with part of the clamp for clamping the holder on a boat or other object being omitted.

Fig. 3 is a view of the holder from line 3—3 of Fig. 2, the base of the holder being omitted.

Fig. 4 is a sectional view taken along lines 4—4 of Fig. 2.

Fig. 5 is a sectional view taken along line 5—5 of Fig. 1.

In detail, the holder illustrated in the drawings comprises an elongated cradle-like device in which there is a supporting member 1 having a flattened disk-like segment 2 integral therewith and depending therefrom (Figs. 1, 2).

The member 1 is formed with an arm 3 projecting generally laterally therefrom, and the outer end of said arm is enlarged, as indicated at 4 in Figs. 1, 3.

The enlargement 4 on arm 3 pivotally supports a pair of curved jaws 5 in position with their concave sides in generally opposed relation and for movement of the jaws toward and away from each other. This movement of the jaws is in direction transversely of the longitudinal axis of the cradle-like device, and is provided for by forming the lower ends of the jaws with right angle extensions 6 and by journalling said extensions in said enlargement 4. The jaws are preferably enclosed in rubber or other resilient material 7 for engagement with opposite sides of the handle 8 of a fishing rod (Figs. 1, 5), when the jaws are swung toward each other. A spring 9 (Fig. 5) secured to enlargement 4 may react against the jaws to yieldably urge them apart to a position releasing the handle 8.

Projecting upwardly from the enlargement 4 is a support 10 against which the handle 8 is held by jaws 5 when the latter grip the handle so that the handle will not interfere with the closing of the jaws thereon.

A U-shaped lever, generally designated 11 (Fig. 3) is pivoted intermediate its ends on a bolt 12 to member 1. The closed end of said lever extends across the outer end of the enlargement 4, while the two arms 13 of the lever extend below the divergently outwardly extending portions 14 of jaws 5 (Fig. 5), and past the opposite sides of member 1, to a point spaced a substantially greater distance from the bolt 12, than the closed end of the lever is spaced from the latter.

The end portions 15 of arms 13 are bent upwardly at substantially right angles to the said arms (Figs. 1, 2) and said end portions are preferably enclosed in rubber or other relatively soft resilient material 16.

The ends of arms 13 adjacent portions 15 are connected together by a bolt 17 that is enclosed within a sleeve 18 of rubber or the like (Fig. 3). When the handle 8 is supported on the projection 10 with the end of the handle nearest its butt on said projection, the handle will extend between portions 15 of arms 13 and will rest on the cushion-covered bolt 17, thereby causing the arms 13 to swing on bolt 12, whereupon the ends of the arms adjacent the closed end of the lever will engage the slanted-downwardly facing sides of divergent portions 14 of the jaws 5, causing said jaws to swing toward each other for tightly gripping the handle 8 between them.

Inasmuch as the tip-end of the pole projects beyond the portions 15 of arms 13, the greatest weight of the pole is on the bolt 17, tending to swing the bolt 17 downwardly and to swing the closed end of the lever 11 upwardly. As this upward movement will cause jaws 5 to close, it will be seen that the greater the pull on the tip end of the pole, the tighter the jaws 5 will grip the handle 8.

The disk-like segment 2 that depends from the member 1 has an annular row of teeth 20 formed on its periphery. This segment 2 is centrally supported on a horizontal bolt 21, rotating on the latter, the bolt 21 in turn being supported on the upper end of bracket 22, which bracket extends upwardly from one edge of a circular horizontal base 23 with which it is integral.

The base 23 is formed with an inverted U-shaped projection 24 adjacent bracket 22, and which projection is adapted to be engaged between any adjacent pair of teeth 20 when the segment is closely against bracket 22 (Fig. 4). The wing nut 25 on bolt 21 functions to draw the segment against the bracket when the former is rotated to the desired position of inclination of the cradle-like device that is carried on member 1. To adjust this degree of rotation, it is merely necessary to loosen the wing nut 25 and to disengage the projection 24 from teeth 20.

The base 23 is centrally apertured for a vertical pivot or bolt 27 (Figs. 2, 4) and which bolt secures said base to either leg 28 or base 29 of a U-shaped clamp in which the leg 30 that is opposite leg 28 is threaded for axial movement of a threaded post 31 that carries a clamping jaw 32 on its end that projects between legs 28, 30.

This bolt 27 has a head 33 adapted to fit in a recess in the side of leg 28 that faces jaw 32, while opposite end of the bolt projects above base 23 and is provided with a wing nut 34 for tightly securing the base to leg 28 if desired and with the base at any desired degree of rotation on the bolt.

When the base 23 is secured on the leg 28 of the clamp, it is obvious that the clamp may be secured to the edge of a horizontal platform or the like. If the only available means for attachment of the clamp is an edge of a generally vertically disposed member, then the bolt 27 may be quickly shifted to recess 34' (Fig. 1) of base 29 of said clamp; whereupon the base 23 will be supported generally horizontally even though the clamp is turned so that base 29 is uppermost instead of being vertical and at the side as seen in Fig. 1.

In operation the thumb nut 34 may be loosened to permit swivelling of the base 23 thereon as the pole is turned, either due to the movement of the fish or due to the movement of the boat from which the fisherman may be operating. Thus, any possibility of the line being snapped at the pole is eliminated. The fisherman may, of course, tighten the base 23 on the leg 28, if desired.

Should the fisherman desire to manually manipulate the pole, either by reason of a strike or for any other reason, there are no bolts or clamps to loosen. Instead, all the fisherman need do is to lift the handle 8 from the holder, the same being free between jaws 5 and portions 15 for grasping, and the pole will automatically be freed from the holder. Immediately upon repositioning the handle on the holder and releasing it, the jaws 5 will automatically grip the handle and this grip will tighten as any force is applied to the pole that would normally tend to loosen it.

The fisherman may quickly adjust the angle of the pole by merely loosening the wing nut 25 to release projection 24 from between a pair of the teeth 20, and then turning the segment 2 the desired amount and re-tightening the nut.

I claim:

A fishing rod holder for an inclined or horizontal rod comprising a generally horizontally extending U-shaped member positioned with its legs horizontally spaced apart, the outer ends of said legs opposite the U-bend extending upwardly in horizontally spaced relationship for positioning a portion of the handle of a fishing rod therebetween with the butt end of such rod extending over said U-bend, a cross piece connecting said legs adjacent the lower ends of the aforesaid upward extensions of said legs for supporting said rod, a support for said member, a horizontal pivot extending through said legs at a point between the U-bend and the free ends of said legs pivotally supporting said member for swinging in a vertical plane about said pivot, an extension on said support terminating adjacent said U-bend, a pair of upwardly extending jaws between said legs and pivotally secured at their lower ends to the outer end of said extension for swinging thereof to and from clamping engagement with said butt end of said rod when the latter extends across said U-bend, the portions of said jaws adjacent and above their pivoted lower ends extending divergently outwardly relative to each other in an upward direction for engagement with the said legs of said member adjacent said U-bend when the latter is swung upwardly about said pivot for automatically closing said jaws about said butt end.

MILTON STEUER.

REFERENCES CITED

The following references are of record in the file of this patent:

UNITED STATES PATENTS

| Number | Name | Date |
|---|---|---|
| 1,963,463 | Hammer | June 19, 1934 |

FOREIGN PATENTS

| Number | Country | Date |
|---|---|---|
| 596,336 | France | Oct. 21, 1925 |